United States Patent [19]

Sutherland

[11] Patent Number: 5,025,749
[45] Date of Patent: Jun. 25, 1991

[54] ASSEMBLY FOR FINISHING DOUGHNUTS WITH ICINGS AND CONDIMENTS

[75] Inventor: Jackie R. Sutherland, Independence, Kans.

[73] Assignee: Daylight Corporation, Tulsa, Okla.

[21] Appl. No.: 513,100

[22] Filed: Apr. 19, 1990

[51] Int. Cl.⁵ .............................................. A23G 3/24
[52] U.S. Cl. ...................................... 118/28; 118/26; 118/421; 118/500; 312/40.4; 108/92; 108/101; 108/102
[58] Field of Search ....................... 118/13, 16, 23, 26, 118/28, 31, 421, 428, 500; 312/40.4; 108/92, 97, 101, 102; 99/516, 594

[56] References Cited

U.S. PATENT DOCUMENTS

| | | | |
|---|---|---|---|
| 915,291 | 3/1909 | Hérissé | 118/28 |
| 1,267,524 | 5/1918 | Ewart | 108/102 |
| 1,831,763 | 11/1931 | Dickerson | 118/26 |
| 2,222,390 | 11/1940 | Ackles | 118/28 |
| 2,658,810 | 11/1953 | Ellis et al. | 312/198 |
| 2,894,604 | 7/1959 | McMillan | 312/236 |
| 3,162,495 | 12/1964 | Swift | 312/223 |
| 3,210,143 | 10/1965 | Frederick | 312/281 |
| 3,702,209 | 11/1972 | Moore | 108/102 |
| 4,037,896 | 7/1977 | Kennedy, Jr. et al. | 312/281 |
| 4,751,878 | 6/1988 | Lopes | 99/452 |

Primary Examiner—Richard V. Fisher
Assistant Examiner—Todd J. Burns
Attorney, Agent, or Firm—Head & Johnson

[57] ABSTRACT

An assembly for speeding the process of finishing doughnuts with icings and condiments, the table being elongated and having a horizontal upper surface and an elongated opening therein providing opposed parallel ledges lengthwise of the table and, having below the table upper surface and within the elongated opening, opposed horizontal ledges of reduced spacing therebetween, and including a plurality of rectangular shallow depth pans for receiving doughnuts thereon, the pans having, at the opposed end walls, outwardly extending lip portions, the length of the pan between the end walls being such that the lip portions slide upon the spacing between the table parallel upper surface ledges, and a plurality of pans having end walls of spacing less than that of the trays and having outwardly extending lip portions which engage the lower horizontal ledges of the table so that the trays may be slid upon the table within the opening and over the icings and condiments containing pans.

7 Claims, 5 Drawing Sheets

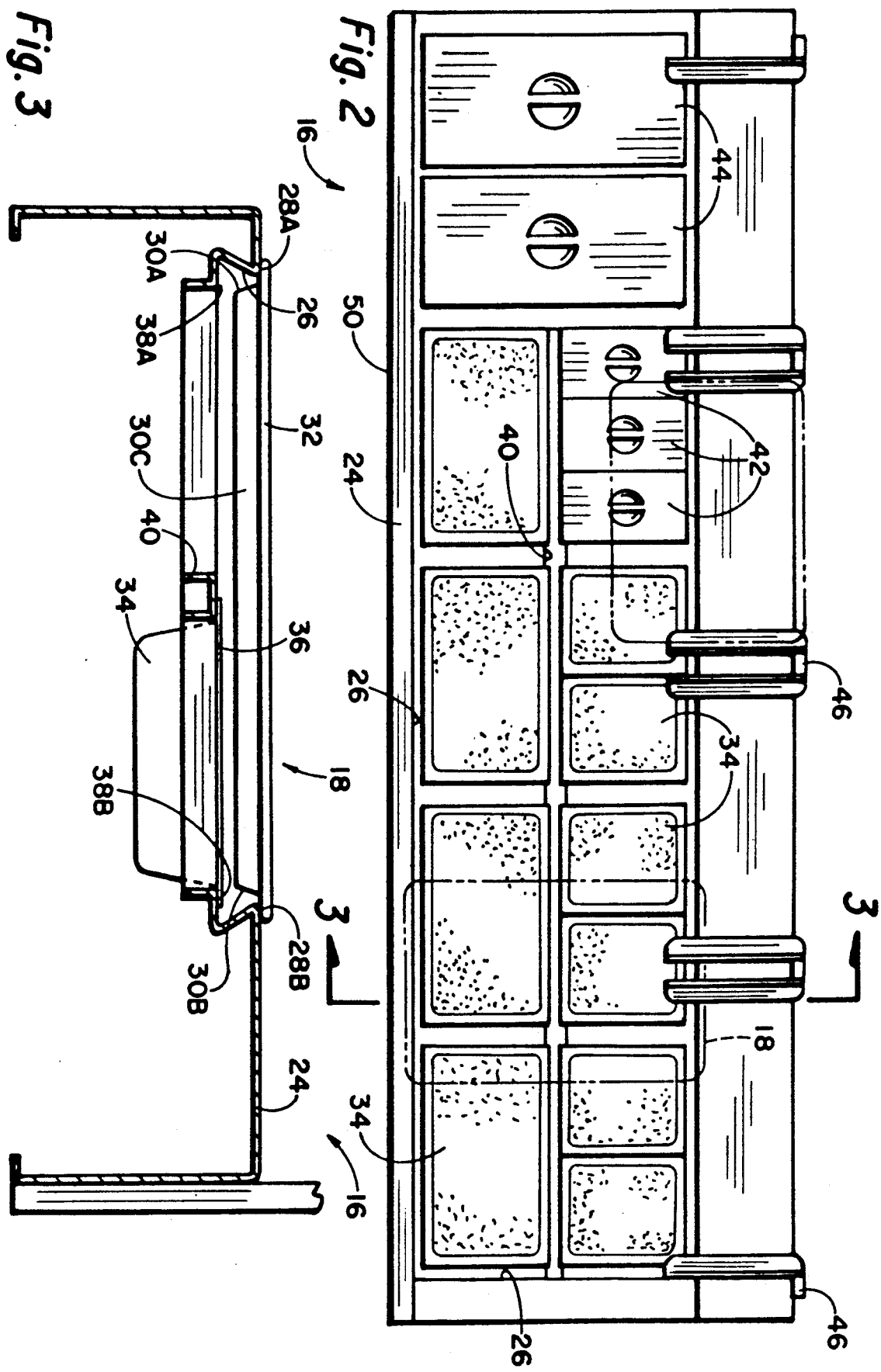

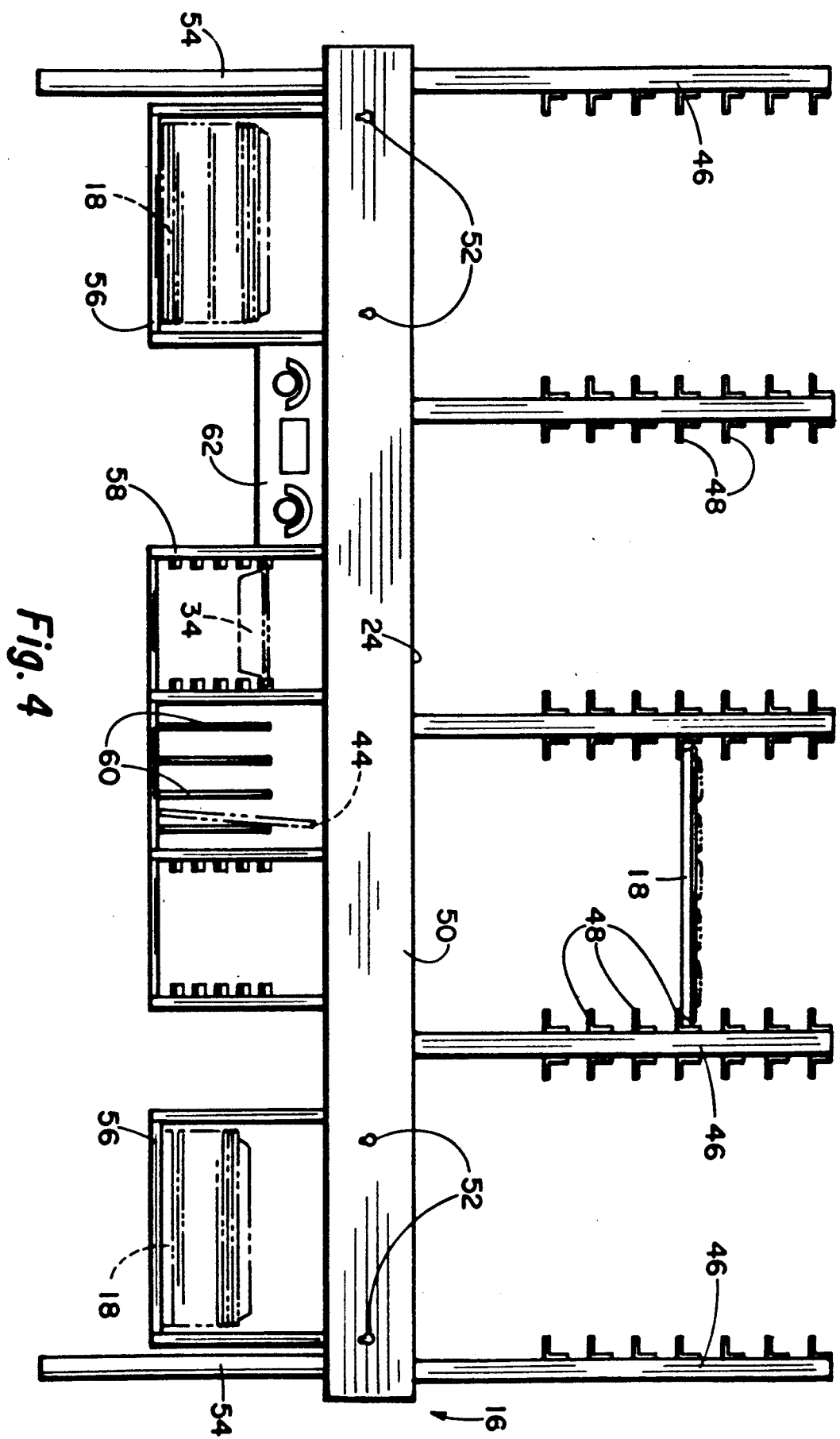

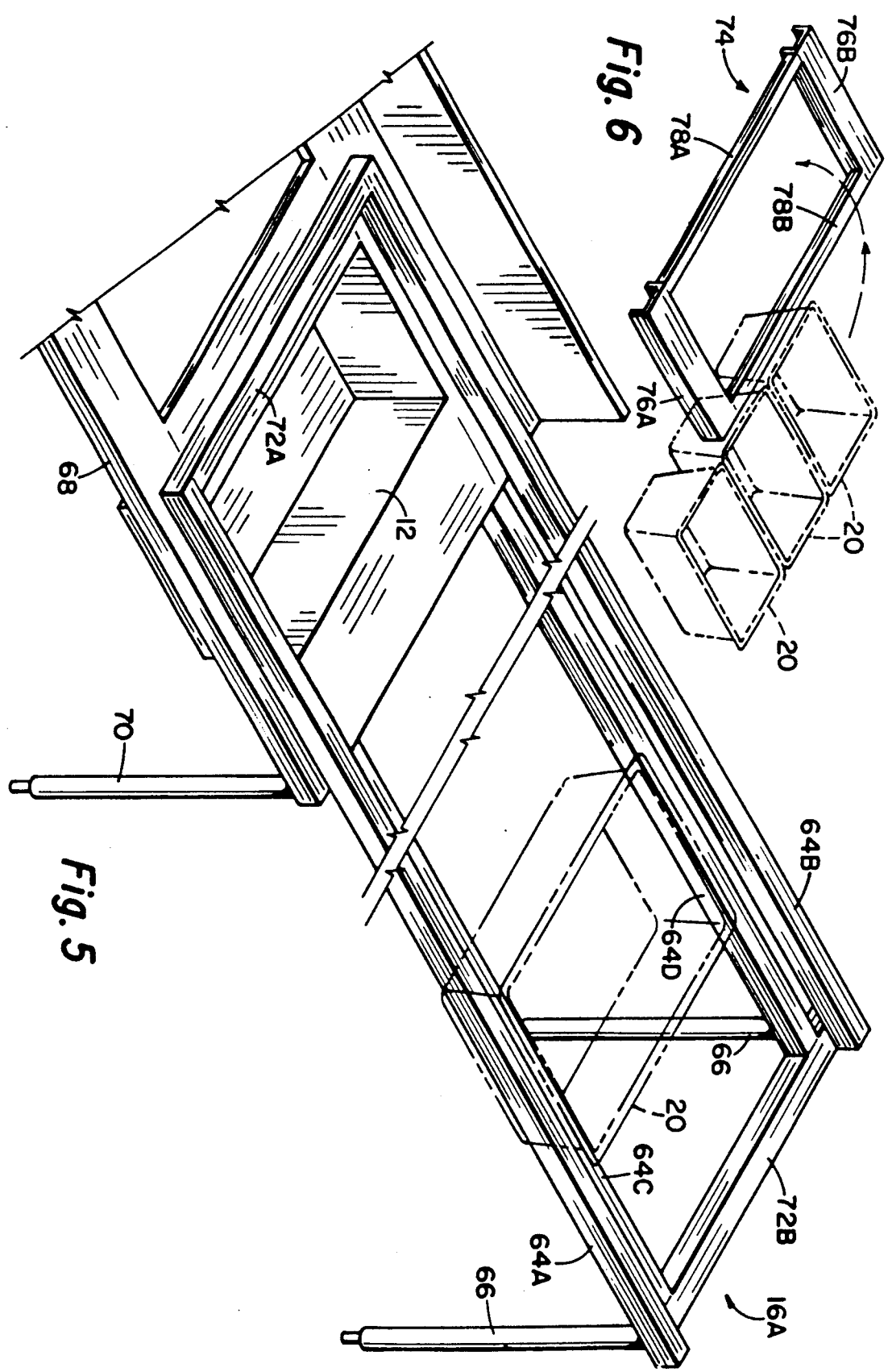

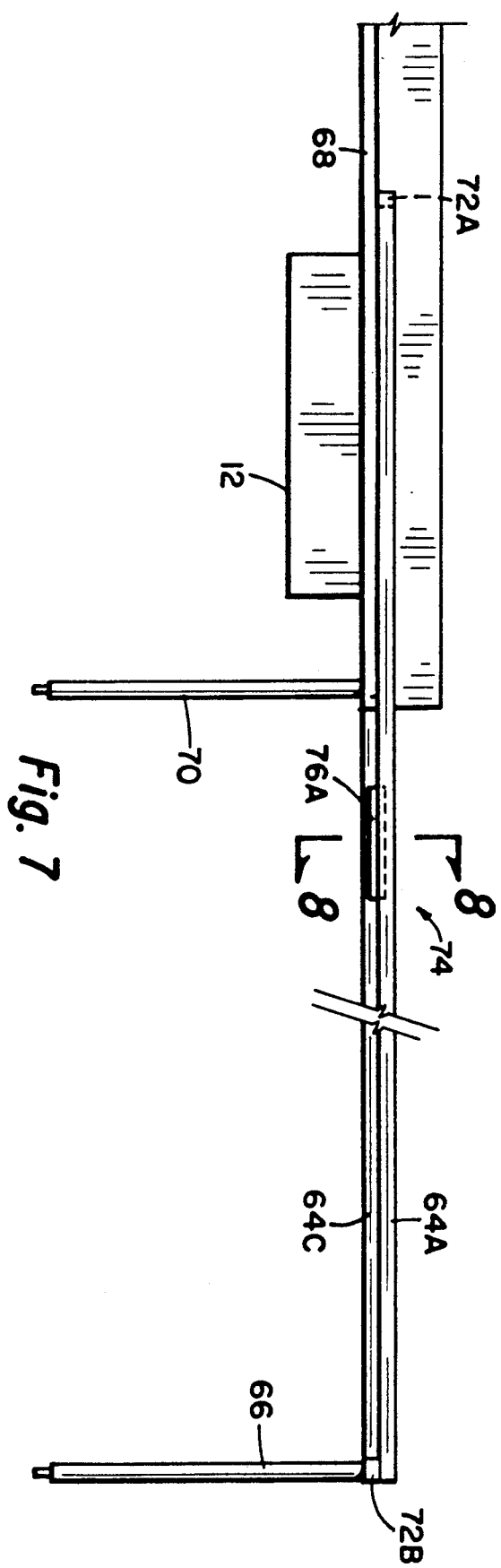
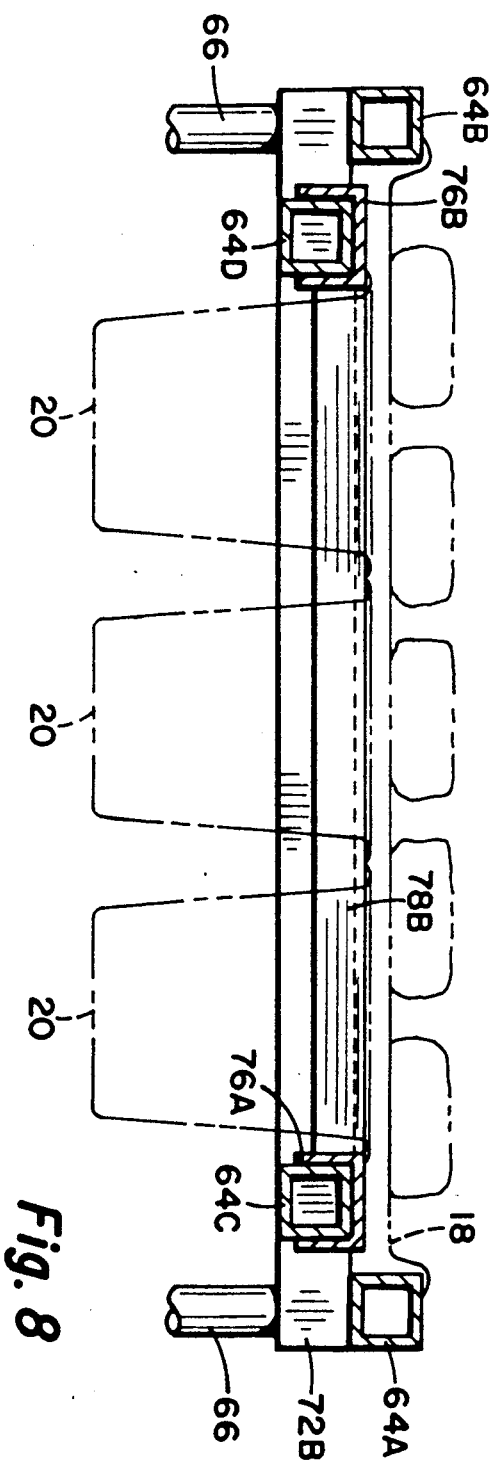
Fig. 7
Fig. 8

ASSEMBLY FOR FINISHING DOUGHNUTS WITH ICINGS AND CONDIMENTS

SUMMARY OF THE INVENTION

A favorite food in America and in other parts of the world is doughnuts and similar deep fried pastries. The disclosure will be described as it relates to doughnuts, it being understood that by "doughnuts" is meant any deep fried food product typically produced in a doughnut shop or bakery. One reason for the consistent popularity of doughnuts is the great variety available from bakeries and doughnut shops. This great variety is achieved by using different dough recipes, different configurations of the products, in addition, and most important, by applying different icings and condiments to the doughnuts.

The typical operator of a doughnut shop or bakery specializing in doughnuts produces doughnuts in batches, such as ten to twenty at a time and then treats the doughnuts with different types of icings and condiments to achieve goods which appeal to different people. For instance, out of a single batch of doughnuts the shop operator may dip some either wholly or partially with chocolate icing, some in white icing and some in red colored icing and some in caramel icing. Some of the doughnuts with caramel icing may be covered with chopped pecans, while some with white icing may be covered with coconut, and so forth. Thus, out of one batch of doughnuts, an operator can concurrently provide a wide variety of different products appealing to a wide variety of tastes.

One of the problems of doughnut shop owners and bakers is that of efficiently handling a batch of doughnuts to provide the desired combination of icings and condiments. In the past, a typical operation has consisted of placing on a table a number of pans of icing and adjacent to the pans, containers of condiments. The operator then must move each individual doughnut to a pan for dipping the doughnut in icing, followed by moving the dipped doughnut to a container of condiments. The doughnut, after the proper icings and condiments have been applied, must then be placed back into a pan for cooling. This requires the operator to make a number of individual spaced apart steps to treat a batch of doughnuts to achieve the variety of products desired.

The present disclosure is directed to an assembly to speed the process of coating doughnuts with icings and condiments. As used hereinafter and throughout, and, as previously stated, the word "doughnuts" includes other bakery and fried items such as "longjohns,""twists,""doughnut holes" and so forth, it being understood that the term "doughnuts" is employed generically to mean bakery or fried food items that are commonly coated wholly or partially with icings and/or condiments.

The assembly for coating doughnuts with icings and condiments includes an elongated table having a horizontal upper surface and an elongated opening in the upper surface. This elongated opening provides a first pair of upper opposed parallel ledges lengthwise of the table and in a horizontal plane. The spacing between the ledges is of a selected uniform dimension.

The table is further configured so that it has below the upper surface and within the elongated opening, a second, lower pair of opposed paralleled spaced apart ledges. The spacing between the second pair of ledges is uniform and is less than that of the first pair of ledges at the table upper surface.

A plurality of rectangular shallow depth doughnut holding trays are used in the assembly. Each tray has a bottom, short height opposed end walls, short height opposed side walls and an open top. The trays have uniform length between the end walls, and each has a lip extending outwardly from at least the end walls, although typically the lip will extend around the full periphery of each tray.

The length between the opposed end walls of each tray is slightly less than the spacing between the upper parallel ledges of the table so that the trays are positionable in the elongated opening in the table upper surface and slidable along the top of the table.

A plurality of icing and/or condiment containing rectangular pans are provided, each having a bottom, an open top having a peripheral edge therearound, opposed end walls and opposed side walls. Each pan has an outwardly extending lip around at least a portion of the upper peripheral edge. The spacing between the end walls is less than the spacing between the end walls of the trays and slightly less than the spacing between the lower ledges of the table.

The plurality of pans are removably receivable in the opening in the table, and the peripheral edges of the pan engage the lower ledges of the table so that a number of pans may be supported on the lower ledges.

The trays are slidably received in the opening above the pans.

In using the assembly for speeding the process of coating doughnuts with icings and condiments of this disclosure, a number of pans having different icings and different condiments are positioned in the table opening and the rest on the lower ledges. A tray is positioned on the table at one end and filled with a freshly deep fried batch of doughnuts. The tray with the doughnuts therein can be moved along the table over the tops of the pans. The operator can remove doughnuts individually and dip them directly below the tray into a selected icing held in a pan on the table lower ledges. After a doughnut is dipped, it is placed into the tray, and additional doughnuts are dipped in the same or different icings. In the same manner, the operator after dipping a doughnut in icing, can then dip it into a condiment and place the doughnut back onto the tray, moving the tray along so that all of the processing of the doughnuts in one batch can be accomplished in moving the tray from one end to the other end of table, during which time the tray will pass over all of the different available icings and condiments. After a batch of doughnuts in a tray has been treated as desired, the tray can then be moved to a rack above the table surface for drying.

In the preferred arrangement, the table is positioned immediately adjacent the doughnut frying equipment so that the operator moves the doughnuts directly from the frying operation to a tray for treatment to thereby maintain maximum time efficiency and economy in cooking and treating doughnuts to place them in funushed condition for sale.

Others have provided types of tables and various equipment for use in treating food items for applying icings, condiments decorations and so forth, and reference may be had to the following issued U.S. Pat. Nos. as background information: 2,658,810; 2,854,945; 2,894,604; 3,162,495; 3,210,143; 4,037,896 and 4,751,878.

The invention will be better understood by reference to the following description and claims, taken in conjunction with the attached drawings.

DESCRIPTION OF THE DRAWINGS

FIG. 2 is an enlarged plan view of the doughnut finishing table of FIG. 1.

FIG. 3 is an enlarged cross-sectional view of the doughnut finishing table as taken along the line 3—3 of FIG. 2.

FIG. 4 is a front elevational view of the doughnut finishing table of FIG. 2, showing the use of auxiliary equipment in conjunction with the finishing table to expedite finishing doughnuts, including facilities for storing trays as employed in the system of this disclosure.

FIG. 5 is an isometric view of an alternate embodiment of the table formed of square tubing.

FIG. 6 is an isometric view of an adapter for use on the table of FIG. 5, the adapter serving to receive a pan or pans therein.

FIG. 7 is an elevational, partial front view of the table of FIG. 5.

FIG. 8 is a cross-sectional view taken along the line 8—8 of FIG. 7 showing the adapter of FIG. 6 mounted on the table.

DESCRIPTION OF THE PREFERRED EMBODIMENTS

Figure 1:
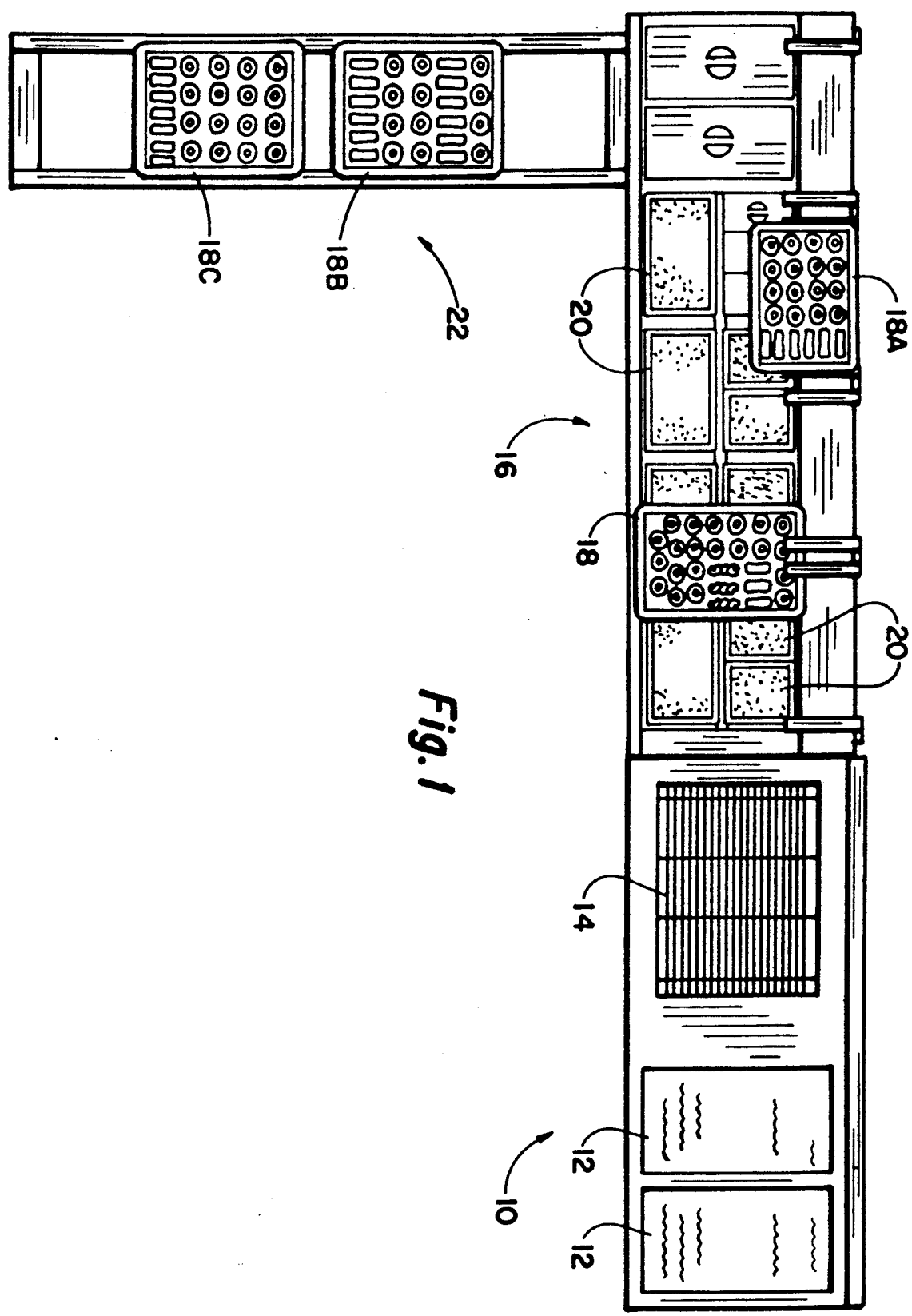
FIG. 1 is a plan view of the layout of an arrangement employing the assembly of this disclosure for speeding the process of coating doughnuts with icings and condiments, showing the table employed for such purposes adjacent a cooking facility and showing an auxiliary table which may be utilized in conjunction with the doughnut finishing table.

Referring to the drawings and first to FIG. 1, a plan view of an assembly that employs the principles of this disclosure is shown for finishing doughnuts. The plan view of FIG. 1 is such as would be employed in the kitchen of a doughnut shop, bakery or the like. Doughnuts or similar food items are typically prepared in a deep fat fryer section, indicated generally by the numeral 10, having one or more deep fat fryers 12 in which doughnuts and similar items are prepared. After a batch of doughnuts is cooked in the deep fat fryers 12, it is typically removed in metal wire baskets (not shown) and placed on a drainage area 14 where any excess oil remaining on the finished goods drips away. After remaining for a short time on the drainage area 14, the batch of cooked doughnuts is ready to be further processed. It is understood that a certain amount of such cooked doughnuts are no longer further treated and are ready for consumption, but many require finishing and for this purpose, this disclosure is concerned with an assembly including a finishing table, generally indicated by the numeral 16, which will be described in greater detail subsequently.

Doughnuts, after being drained in the drainage area 14, are placed in a shallow depth tray 18. The tray is moved along the finishing table 16 in a manner to be described subsequently. The finishing table includes a plurality of pans 20 that contain icings or condiments. The doughnuts, by the unique features of the finishing table 16, can be readily moved from tray 18 into any one of the pans 20 for receiving icings and/or condiments on the doughnuts. After dipping into the icings or condiments, the doughnuts are placed back onto the tray 18 until all of the doughnuts of the batch on the tray are finished, after which the tray is placed in a cooling rack in a manner to be herein after described. Tray 18A of FIG. 1 is shown as positioned in a cooling rack.

FIG. 1 further shows an auxiliary table, indicated generally by the numeral 22, which may be used in conjunction with the finishing table 16 as an additional work area. Trays 18B and 18C are shown on the auxiliary table.

Referring now to FIGS. 2 and 3, the details of the finishing table 16 will be further described.

The table 16 includes an upper horizontal surface 24 having an elongated opening 26 therein. The opening in the table upper surface 24 provides opposed parallel ledges 28A and 28B (See FIG. 3) that run lengthwise and for substantially the full length of the table. The spacing between the ledges 28A and 28B is preselected and uniform throughout the length of the table.

Slidably received on the table upper surface 24 and, specifically, on the parallel ledges 28A and 28B, is, as shown in FIG. 3, a tray 18. The tray has opposed end walls 30A and 30B, and opposed side walls, only side wall 30C being seen in FIG. 3. The length between th opposed end walls 30A and 30B is slightly less than the spacing between ledges 28A and 28B and the table top surface 24.

Each tray 18 has an open top and peripheral edge around the top, including a peripheral lip 32. The lip 32 engages the table upper ledges 28A and 28B so that tray 18 may be slid along the full length of the opening 26 in the table top surface 24.

Supported by the table 10 and below the top opening 26 are a plurality of pans 34. Each pan 34 has a circumferential lip 36. The table is provided with lower ledges 38A and 38B. In additon, in the embodiment illustrated, a channel member 40 runs the length of the table below the upper surface 24 and parallel to and spaced intermediate the lower ledges 38A and 38B. Lips 36 of pans 34 rest upon ledges 38A and 38B and channel member 40. The pans 34 contain icings and condiments and are positioned in the table elongated opening 26, however, the pans, once positioned are not intended to be moved in the manner that trays 18 are moved. The upper surface 24, parallel edges 28A and 28B, and lower edges 38A and 38B can be constructed of sheet metal.

FIG. 2 shows the assembly in which finishing table 16 is arranged with a number of pans 34 of different sizes. Covers 42 may be placed on the top of individual pans as needed to protect the ingredients therein. At the end of the table are two large covers 44 which protect pans. The covers 42 and 44 can be removed when it is necessary to use the contents of the pans enclosed by the covers.

In the finishing of doughnuts, the operator places a batch of freshly cooked doughnuts from the fryer seciton 10 onto a tray 18. He then moves the tray along the length of table 24, dipping doughnuts individually into icings and/or condiments in pans 34, as desired, and returning the dipped doughnut to the tray. The tray is moved along until all of the doughnuts in a batch are treated with icings and/or condiments as desired. After all of the doughnuts in tray 18 are finished, the tray is set aside to allow the icing thereon to cool before the tray is placed in position for distribution of the finished doughnuts. Cooling of the doughnuts on the tray can be achieved utilizing the rack system as shown in FIGS. 1 and 2 and better in FIG. 4.

Extending uprightly from the table are a plurality of vertical supports 46, five being shown in FIGS. 2 and 4. Secured to the vertical supports 46 are horizontal L-shape slides 48. The slides 48 between the adjacent supports slidably receive trays 18 thereon (only one tray being shown in FIG. 4) but the provision for a large number of trays is illustrated.

The finishing table 16 has a front surface 50, best seen in FIG. 4, having openings 52 therein which can receive the tabs of auxiliary tables, such as auxiliary table 22, as shown in FIG. 1. The openings 52 are shaped like a keyhole to receive the head of a bolt, allowing the tables to be quickly attached to or removed from the finishing table 16.

Below the table 16, which is supported on legs 54, are a number of auxiliary storage devies, such as a rack 56 for stacking trays 18 thereon. An additional rack 58 provides for storing pans 34, only one pan being shown.

Vertical racks 60 provide for storage of lids, such as lids of the type identified by the numerals 42 and 44 of FIG. 2.

Some icings must be maintained in a heated condition at the time they are applied to doughnuts. For this purpose, a heating system may be provided in conjunction with finishing table 16, and if used, the temperature thereof may be controlled from a temperature control panel 62.

FIGS. 5 through 8 show an alternate embodiment of the assembly. In this embodiment the finishing table 16A is formed primarily of four horizontal lengths of square cross-sectioned tubing 64A, 64B, 64C and 64D. One end of the table 16A is supported by legs 66. The other end is supported by an auxiliary table 68 having legs 70. The auxiliary table 68 may be that which contains deep fat fryers 12.

The lengths of tubing 64A and 64B are spaced apart by lateral members 72A and 72B. Member 72B is affixed to the ends of tubing 64C and 64D and is also affixed to the upper ends of legs 66.

The spacing between tubing 64C and 64D is dimensioned to receive pans of icing or condiments, such as pans 20 as shown in FIG. 1. The spacing between tubing 64A and 64B is dimensioned to receive trays, such as trays 18 of FIG. 1. (See FIG. 8).

To enable the lower tubing members 64C and 64D to receive different size pans, an adapter 74, as shown in FIG. 6, may be employed. The adapter is formed of spaced apart paralleled inverted channel members 76A and 76B, the spacing conforming to the spacing between tubing members 64C and 64D. Connecting the inverted channel members 76A and 76B are coss-members 78A and 78B. The spacing between cross-memebers 78A and 78B is selected to receive icing or condiment pans 20.

FIG. 7 shows a front view of the table of FIG. 5, and FIG. 8 shows the adapter 74 positioned on the lower tubular members.

The use of tubular members, such as square, cross-sectional metallic tubes as illustrated provides a table which has the same utility as that of FIGS. 1 through 4, and which is used in the assembly in the same way for finishing doughnuts, but the use of the tubular members simplifies and reduces the expense of construction of the table.

The assembly for speeding the process of coating doughnuts with icings and condiments of this disclosure provides a greatly improved method of finishing doughnuts compared to that employed in the typical bakery or doughnut shop. The unique features of the assembly, including particularly the finishing table assembly, allows an operator to expeditiously finish a batch of doughnuts with a wide variety of icings and condiments in a smooth, single pass operation with the doughnuts expeditiously moved from the frying section to the finishing section and to cooling, requiring a minimum number of steps of the operator and with minimum lost motion.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An assembly to speed the process of finishing doughnuts with icings and condiments comprising:

a plurality of rectangular shallow depth doughnut holding trays each having a bottom, short height opposed end walls, side walls and an open top, the trays having a uniform length between end walls, and having a lip extending outwardly from at least said end walls;

a plurality of icing and/or condiment containing rectangular pans each having a bottom, an open top having a peripheral edge therearound, opposed end walls, and opposed side walls, each pan having an outwardly extending lip portion around at least a portion of the upper peripheral edge;

an elongated table having a horizontal upper surface and an elongated opening in the upper surface providing upper opposed, paralleled ledges lengthwise of the table and in a horizontal plane, the spacing between the upper ledges being slightly greater than the spacing between said end walls of said trays, the trays being receivable in said opening whereby the tray lips rest upon said table upper ledges and said trays may be individually slid along on said table upper surface, the table having, below said upper surface and within said elongated opening, means to removably receive, in a common horizontal plane, a plurality of said pans, the upper peripheral edges of said pans being below said table upper surface a distance greater than the depth of said trays whereby said trays may be slid upon said table within said opening with said icing and/or condiment containing pans therebelow.

2. An assembly to speed the process of finishing doughnuts according to claim 1 wherein said means to removably receive a plurality of said pans includes horizontal ledge forming structural means, the spacing between the ledges formed thereby being dimensioned to individually receive said pans therein, said lip portions of said pans resting on said ledge forming structural means.

3. An assembly to speed the process of finishing doughnuts according to claim 2 wherein a portion of said horizontal ledge forming structural means is formed by horizontal spaced apart lower ledges affixed to said table upper surface.

4. An assembly according to claim 3 wherein said table upper surface is formed of sheet metal, and wherein said sheet metal is formed in vertical cross-section taken perpendicular to the length of said elongated opening by opposed parallel edges each of which is defined by a first, integral generally vertical portion extending downwardly from said top surface and having a lower edge; and by a horizontal short length portion extending integrally from said vertical portion lower edge and having an inner edge, such short length horizontal portion providing at least a portion of said pan supporting horizontal ledge forming structural means.

5. An assembly according to claim 4 wherein said sheet metal is further formed by a second intregral generally vertical portion extending downwardly from said horizontal short length portion inner edge.

6. An assembly according to claim 1 including a plurality of vertically stacked horizontal cooling racks supported above said table.

7. An assembly according to claim 1 including auxiliary table means extending perpendicular to said table at one end thereof.

* * * * *